United States Patent [19]

Tahara et al.

[11] Patent Number: 4,804,597

[45] Date of Patent: Feb. 14, 1989

[54] ORGANIC ELECTROLYTE CELL

[75] Inventors: Kensuke Tahara; Hideo Sakamoto, both of Sendai, Japan

[73] Assignee: Seiko Electronic Components Ltd., Miyagi, Japan

[21] Appl. No.: 120,619

[22] Filed: Nov. 13, 1987

[30] Foreign Application Priority Data

Nov. 13, 1986 [JP] Japan ................... 61-270766
May 15, 1987 [JP] Japan ................... 62-118267
Aug. 11, 1987 [JP] Japan ................... 62-200280
Sep. 18, 1987 [JP] Japan ................... 62-234041

[51] Int. Cl.$^4$ .................... H01M 6/14; H01M 4/58
[52] U.S. Cl. .................... 429/197; 429/194; 429/218
[58] Field of Search .......... 429/194, 197, 218; 252/518, 182.1; 423/617

[56] References Cited

U.S. PATENT DOCUMENTS

| 4,042,535 | 8/1977 | May | 252/518 |
| 4,085,259 | 4/1978 | Lauck | 429/194 |
| 4,399,204 | 8/1983 | Clark | 429/197 |
| 4,546,057 | 10/1985 | Broussely et al. | 429/197 X |
| 4,675,171 | 6/1987 | Kubo et al. | 423/617 |

FOREIGN PATENT DOCUMENTS 57-170463 10/1982 Japan .................... 429/197

OTHER PUBLICATIONS

Patent Abstract of Japan, vol. 4, No. 162 (E-33) [644], Nov. 12, 1980.
Journal of Power Sources, vol. 16, No. 4, Dec. 1985, pp. 263-269, "Button Cells Based on the Li/Bi$_2$O$_3$ Couple" by Pistoia et al.
Patent Abstracts of Japan, vol. 10, No. 99 (E-396) [2156], Apr. 16, 1986.
Patent Abstract of Japan, vol. 9, No. 169 (E-328) [1892], Jul. 13, 1985.

Primary Examiner—Brian E. Hearn
Assistant Examiner—Stephen J. Kalafut
Attorney, Agent, or Firm—Bruce L. Adams; Van C. Wilks

[57] ABSTRACT

An organic electrolyte cell having a negative electrode composed of Li, a positive electrode composed mainly of Bi$_2$O$_3$ and an organic electrolyte. The Bi$_2$O$_3$ is heat-treated above 650° C. to increase the discharge capacity of the cell.

25 Claims, 4 Drawing Sheets

ORGANIC ELECTROLYTE CELL

BACKGROUND OF THE INVENTION (1) Field of the Invention

The present invention relates to an organic electrolyte cell and, more particularly, to an improvement in an organic electrolyte cell having bismuth trioxide, $Bi_2O_3$, used as the positive electrode active material.

In organic electrolyte cells having lithium as the negative electrode active material, various cells differing in the operating voltage can be fabricated, but from the practical viewpoint, these cells are roughly divided into a 3-V type having an operating voltage of about 3 V and a 1.5 V type having an operating voltage of about 1.5 V. As the positive electrode active material for the 1.5-V type, there are known cupric oxide, iron sulfide, iron disulfide, lead oxide and bismuth trioxide. A cell fabricated by using bismuth trioxide has a high operating voltage of 1.5 to 1.8 V and this cell is especially advantageous for the use where a large electric current discharge is needed. Moreover, the operating voltage of an organic electrolyte cell comprised of lithium as the negative electrode active material and $Bi_2O_3$ as the positive electrode active material is about 1.5 V since this cell is substantially equivalent in the operating voltage to a conventional ordinary commercial cell using an aqueous alkali electrolyte, such as an alkali-manganese cell or a silver oxide cell, the organic electrolyte cell has an interchangeability with such a conventional cell. Furthermore, since the creep phenomenon which would be observed in the alkali electrolyte is not caused in the organic electrolyte, leakage of the electrolyte is reduced, so that the self-discharge is small and the energy density is high. Because of these advantages, development of a cell having an excellent long-period reliability and a high energy density is expected.

(2) Description of the Related Art

In the case where a cell of this type, for example, a button cell is prepared, the positive electrode is formed in the following manner. Namely, bismuth trioxide as the active material, an electrically conductive material, for example, a carbon powder such as graphite or carbon black or a metal powder and a resin binder such as a fluororesin or polystyrene are mixed together at a predetermined ratio, and a predetermined amount of this positive electrode mixture is packed in a mold of a molding machine and compression-molded to obtain a pellet-shaped positive electrode molded body. The so-obtained positive electrode pellet is heated and dried under reduced pressure at a temperature (up to about 300° C.) not causing thermal decomposition of the resin binder or oxidation of the conductive agent and, after the positive electrode is thus dehydrated sufficiently, the positive electrode is assembled into a cell. Organic electrolyte cells containing bismuth trioxide as the positive electrode active material are disclosed, for example, in Japanese Patent Application Laid-Open specification No. 12425/1977 and Japanese Patent Publication No. 49673/1984 which corresponds to U.S. Pat. No. 4,085,259.

As the organic electrolyte of the cell of this type, there have been used solutions of ionizable salts such as $LiClO_4$, $LiBF_4$, $LiPF_6$ and $LiSO_3CF_3$ as the supporting electrolyte in aprotic organic solvents such as propylene carbonate (hereinafter referred to as "PC"), γ-butyrolactone, tetrahydrofuran, 1,2-dimethoxyethane (hereinafter referred to as "DME"), dioxolane and mixtures thereof.

In general, the electrolyte of the cell should have various characteristics and in view of the cell performance the following properties are most important.

(1) The ion conductivity is high and the electrode reaction speed is high.
(2) The boiling point is high, the solidification point is low, and the range of the operating temperatures is broad.
(3) The electrolyte is stable against the positive electrode and negative electrode materials and the like, and the solubilities of the positive electrode and negative electrode materials are low.
(4) The decomposition voltage is high.

An organic electrolyte formed by dissolving $LiClO_4$ in a mixed solvent of PC having a high boiling point, a low solidification point, a high dielectric constant and a high solubility of the supporting electrolyte and of DME having a low viscosity is excellent in the foregoing properties and therefore this organic electrolyte has been frequently used.

As the electrically conductive material for the positive electrode of the cell of this type, there are known carbon powders such as graphite and acetylene black (carbon black which is called "cell black", prepared by thermal decomposition of acetylene) and metal powders.

When the discharge is carried out in a cell fabricated according to the above-mentioned conventional process by using bismuth trioxide as the positive electrode material, two discharge voltages are observed and a lower operating voltage is obtained at a discharge depth larger than 40%. Accordingly, when this cell is used for an instrument in which a large electric current discharge is needed, a voltage necessary for normally operating the instrument cannot be obtained because of the lowered cell voltage even though a sufficient cell capacity is left.

Especially in case of such an instrument as an electronic watch or an electronic desk-top computer, an average consumption current is as small as several μA and the life required for a cell is as long as several months to 10 years or longer. Also, a pulsating large current discharge is necessary for operating a lamp, a buzzer, a step motor and the like. A cell to be used for this purpose is required to have a long-period reliability and a large current discharge capacity. Therefore, the abovementioned problem is very serious.

SUMMARY OF THE INVENTION

In order to solve such disadvantages, the present invention aims at providing an organic electrolyte cell in which the capacity of the cell can be effectively utilized to the last stage of life even in the case where the cell is continuously used over a long period with a large current pulsating discharge.

It is an object of the present invention to improve the bismuth trioxide positive electrode so that the operating voltage of a cell of this type, especially the operating voltage at a discharge depth larger than 40%, is increased and the effective discharge capacity is improved.

It is another object of the present invention to provide an organic electrolyte cell in which the capacity possessed by the cell can be effectively utilized to the last.

It is a further object of the present invention to reduce expansion of the volume by the discharge, whereby the reliability and stability of the cell in the instrument provided therewith are enhanced and simultaneously the discharge capacity per unit volume is increased.

It is still a further object of the present invention to improve a conductive material for the positive electrode so that the closed circuit voltage and the discharge capacity can be simultaneously increased without the sacrifice of the discharge capacity of the cell of this type.

An organic cell in accordance with the present invention comprises a negetive electrode, a positive electrode including a main active material composed of bismuth trioxide obtained by heating and an organic electrolyte. The bismuth trioxide may be heat-treated at a temperature above 650° C.

DESCRIPTION OF THE PREFERRED EMBODIMENTS

We made research with a view to solving the above-mentioned problems and, as a result, it was found that if bismuth trioxide heat-treated at a temperature higher than 650° C. is used as the positive electrode active material, the operating voltage of a cell of this type, especially the operating voltage at a discharge depth larger than about 40%, is increased and the effective discharge capacity is highly improved. More specifically, in preparing the positive electrode, bismuth trioxide is heat-treated at a temperature higher than 650° C. and the heat-treated bismuth trioxide is then mixed with the conductive material and a binder and is molded into a predetermined shape. Any atmosphere not reducing bismuth trioxide can be used as the heat treatment atmosphere, and the heat treatment may be carried out in open air, in an inert gas or in a vacuum.

When powdery bismuth trioxide is heat-treated at a temperature higher than 650° C., an aggregated body is formed by solidification at the cooling step because of sintering, melting or the like. Accordingly, in order to mix bismuth trioxide homogeneously with the conductive material or binder, it is preferred that the heat-treated bismuth trioxide be sufficiently pulverized into fine particles having a size smaller than 100 μm before the mixing.

When bismuth trioxide is heat-treated at a temperature close to or higher than its melting point, that is, 820° C., bismuth trioxide is molten and is formed into a firm aggregated body by cooling. Therefore, in this case, it is especially important that the heat-treated bismuth trioxide should be sufficiently pulverized into fine particles.

In the case where the discharge is carried out in a cell fabricated by using bismuth trioxide heat-treated at a temperature higher than 650° C., the operating voltage, especially the operating voltage at larger than about 40% discharge depth is increased and therefore the effective discharge capacity to a certain cut-off voltage is highly improved.

The reason why the operating voltage is improved according to the present invention has not been completely elucidated. However, it is presumed that the reason is probably as follows. Namely, if bismuth trioxide is heat-treated at a temperature higher than 650° C., atoms constituting respective particles of bismuth trioxide move violently and subtle changes are caused in crystal surfaces and inner structures of the respective particles, and the electrochemical activity is enhanced. In contrast, if the heat treatment temperature is lower than 650° C., this movement of atoms is small and therefore the operating voltage is not improved.

The present invention will now be described in detail with reference to the following examples.

EXAMPLE 1

A product obtained by heat-treating powdery bismuth trioxide having a purity of 99.99% at 300 to 1000° C. for 5 hours, cooling the heat-treated product and pulverizing it to a particle size smaller than 100μm was used as the positive electrode active material, and an untreated powdery bismuth trioxide was used as the comparative positive electrode active material. The heat-treated and untreated bismuth trioxide were separately mixed with a carbonaceous conductive material (graphite or carbon black) and a binder composed of a fluororesin at a mixing weight ratio of 94.5/5/0.5. The mixture was compression-molded into a pellet together with a positive electrode-holding ring of stainless steel having an L-shaped section, and the molded pellet was heated and dried at 100° C. for 10 hours under reduced pressure to form a positive electrode having a diameter of 9.0 mm, a thickness of 1.1 mm and a theoretical capacity of 90 mAh.

Figure 2:
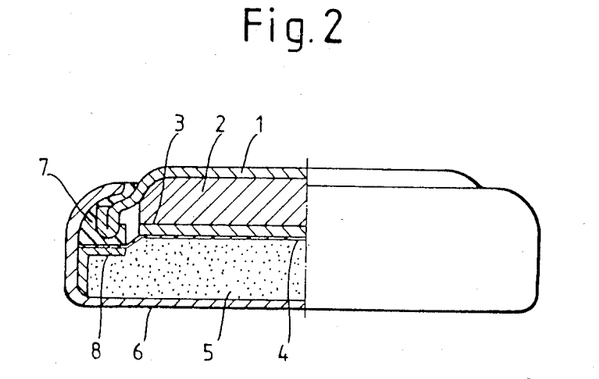
FIG. 2 is a sectional view illustrating an embodiment of the cell according to the present invention.

FIG. 2 is a sectional view showing the cell according to one embodiment of the present invention. In FIG. 2, reference numeral 1 represents a negative electrode container acting as the negative electrode terminal, which is obtained by draw-forming an Ni/stainless steel clad sheet having a thickness of 0.22 mm, and reference numeral 2 represents a negative electrode which is formed by punching a lithium sheet having a thickness of 1.3 mm into a disc having a diameter of 6.4 mm and is press-bonded to the inner surface of the negative electrode container. Reference numeral 6 represents a positive electrode container acting as the positive electrode terminal, which is obtained by draw-forming an Ni/stainless steel clad sheet having thickness of 0.22 mm. A positive electrode 5 is packed in this positive electrode container and a separator 4 composed of a microporous polypropylene sheet is placed on the positive electrode 5. Reference numeral 3 represents an impregnating member for holding an electrolyte between the positive electrode and the negative electrode, which is formed of a non-woven fabric composed mainly of polypropylene. Reference numeral 7 represents a gasket composed mainly of polypropylene, which is interposed between the negative electrode can 1 and the positive electrode can 6 to keep electric insulation between the positive electrode and the negative electrode, and the cell content is sealed by inwardly bending the opening edge of the positive electrode container 6 and caulking the same. A solution of 1 mole/l of lithium perchlorate in a 1/1 mixed solvent of propylene carbonate and 1,2-dimethoxyethane is used as the electrolyte. The size of the cell is such that the outer diameter is 9.5 mm and the total thickness is 3.0 mm.

Figure 3:
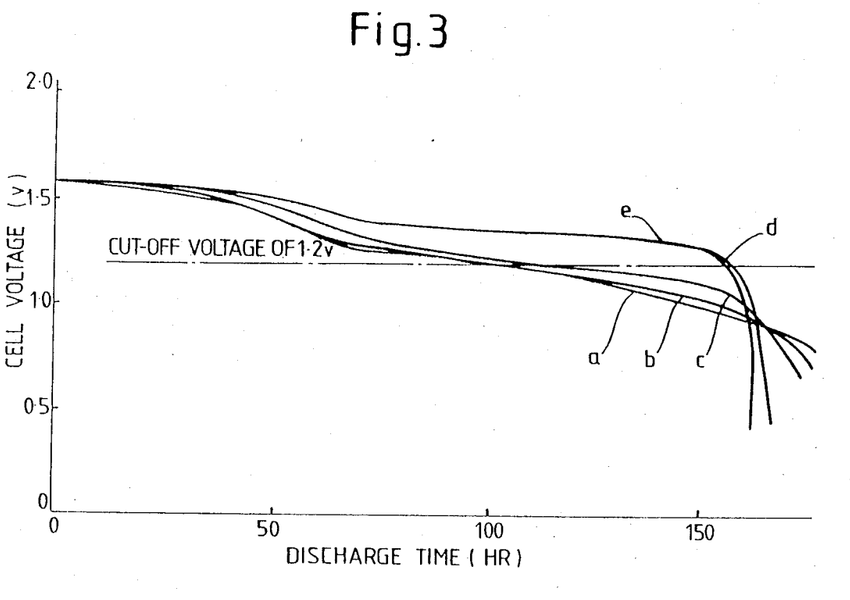
FIG. 3 is a diagram showing discharge change characteristics of different cells prepared by using bismuth trioxide heat-treated at various temperature.

FIG. 3 shows the discharge characteristics of the above-mentioned cell at 24° C. under a constant resistance of 3 k$\Omega$, in which curve (a) shows the result obtained when the bismuth trioxide was not heat-treated, curve (b) shows the result obtained when the heat treatment temperature was 500° C., curve(c) shows the result obtained when the heat treatment temperature was 650° C., curve (d) shows the result obtained when the heat treatment temperature was 800° C. and curve (e) shows the result obtained when the heat treatment temperature was 1000° C. From these results, it is seen that if the temperature for the heat treatment of bismuth trioxide is higher than 650° C., the discharge voltage, especially the discharge voltage in the latter-half flat voltage portion of a larger than about 40% discharge depth, is increased and the discharge time to the cut-off voltage of 1.2 V is prolonged. Thus, it is understood that the discharge characteristics and the effective discharge capacity are prominently improved.

Figure 1:
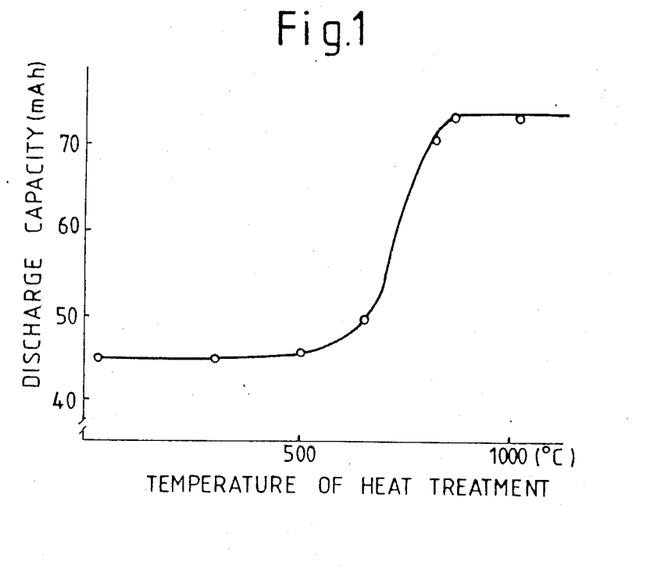
FIG. 1 is a diagram illustrating the relation between the temperature for the heat treatment of bismuth trioxide and the discharge capacity.

FIG. 1 illustrates the relation between the temperature for the heat treatment of bismuth trioxide and the discharge capacity. It is seen from FIG. 1 that if the temperature for the heat treatment of bismuth trioxide is higher than 650° C., the discharge capacity is abruptly increased at heat treatment temperatures of about 800° C., increase of the discharge capacity is saturated at heat treatment temperatures higher than 850° C. and if the heat treatment temperature is further elevated, the discharge capacity is hardly increased but is substantially constant. It is construed that the reason is that since the melting point of bismuth trioxide is 820° C. and bismuth trioxide is in the stable molten state at temperatures higher than 820° C., even if bismuth trioxide is heat-treated at temperatures higher than 820° C., the state after cooling is substantially the same. As seen from FIG. 1, it is understood that if bismuth trioxide is heat-treated at a temperature higher than 650° C., the discharge capacity is greatly increased as compared to the discharge capacity attained when the heat treatment is carried out at a lower temperature or when the heat treatment is not carried out. If the heat treatment temperature is higher than 700° C., this effect is conspicuous, but if the heat treatment temperature is higher than 850° C., further increase of the capacity is hardly attained. In view of this fact and the cost of a heat treatment apparatus such as an electric furnace, the running cost of the apparatus and the handling difficulty of bismuth trioxide, it is preferred that the heat treatment be carried out at 700° to 1000° C.

EXAMPLE 2

A cell was prepared in the same manner as described in Example 1 except that the heat treatment of bismuth trioxide was carried out in nitrogen gas. The cell was subjected to the discharge operation under a constant resistance of 3 k$\Omega$ at 24° C. in the same manner as described in Example 1. The obtained results were substantially the same as those obtained in Example 1.

EXAMPLE 3

A cell was prepared in the same manner as described in Example 1 except that the heat treatment of bismuth trioxide was carried out under a reduced pressure of $10^{-2}$ to $10^{31\ 3}$ Torr.

The cell was subjected to the discharge operation under a constant resistance of 3 k$\Omega$ at 24° C. in the same manner as described in Example 1. The obtained results were substantially the same as those obtained in Example 1.

Organic electrolytes formed by dissolving ionizable salts such as $LiClO_4$, $LiBF_4$, $LiPF_6$ and $LiCF_3SO_3$ as the supporting salt in aprotic organic solvents such as $\gamma$-butyrolactone, propylene carbonete, butylene carbonate, 1,2-dimethoxyethane, tetrahydrofuran, dioxolane, dimethylformamide and mixtures thereof can be used as the organic electrolyte.

Preferably the bismuth trioxide is obtained by melting and heat-treating bismuth trioxide at a temperature higher than the melting point (about 820° C.) and rapidly cooling the melt to solidify the melt. According to such treatment, not only the discharge characteristic but also the storage characteristic can be highly improved.

An atmosphere not reducing bismuth trioxide to metallic Bi or BiO can be used as the atmosphere for melting bismuth trioxide and rapidly cooling the melt. Namely, the melting and rapid cooling treatments can be carried out in open air, in an inert gas or under vacuum.

Any process can be adopted for melting and rapidly cooling bismuth trioxide, so far as deterioration by oxidation or reduction of bismuth trioxide or reaction with other substance is not caused and solidification is completed in a short time. For example, there may be adopted a process in which bismuth trioxide $Bi_2O_3$ heated and molten in an electric furnace or the like is cast in a vessel of an anti-corrosive metal such as stainless steel (for example, SUS#304 by Japanese Industrial Standard (JIS)) or platinum or a ceramic material such as alumina, maintained at a temperature lower than the melting point of $Bi_2O_3$, preferably a temperature lower than the normal temperature.

Furthermore, in the case where bismuth trioxide subjected to the melting and rapidly cooling treatments is used as the positive electrode, in order to mix bismuth trioxide uniformly with a carbon-aceous conductive agent or a binder as required, it is preferred that the cooled and solidified mass of bismuth trioxide be sufficiently pulverized into fine particles having a size smaller than about 100 $\mu$m.

In the cell having bismuth trioxide subjected to the melting and rapid cooling treatments as the positive electrode active material, the discharge characteristic and storage characteristic are highly improved over those of the cell having bismuth trioxide not heat-treated.

The reason why the discharge characteristic is improved by the heat treatment of bismuth trioxide and the storage characteristic is improved by the rapid cooling treatment after the melting treatment has not been completely elucidated, but it is presumed that the reason is probably as described below. Namely, bismuth trioxide includes various crystal forms, such as the $\alpha$-phase of the rhombic system, the $\beta$-phase of the tetragonal system obtained by transition at 700° to 710° C. and the $\gamma$-phase of the cubic system. Ordinarily, the $\alpha$-phase is readily formed if bismuth trioxide is molten and solidified by gradual cooling, and the γ-phase is readily formed by rapid cooling. A great difference of the crystal state is brought about by the difference of the cooling method and it is estimated that also the surface condition of particles is greatly changed according to the cooling method. It is presumed that this difference will probably result in the difference of the stability of the cell with the lapse of time when bismuth trioxide is used as the positive electrode active material for an organic electrolyte cell.

The present arrangement will now be described in detail with reference to the following examples.

EXAMPLE 4

A button type cell was constructed using the same components as shown in FIG. 2. The negative electrode container act also as a negative electrode terminal, which is obtained by drawing an Ni-stainless steel-Ni three-layer clad sheet. The negative electrode is formed by punching a lithium sheet having a thickness of 1.4 mm into a disk having a diameter of 6.2 mm and is press-bonded to the inner surface of the negative electrode container. The positive electrode container is formed of Ni-plated stainless steel, which also acts as a positive electrode terminal. The positive electrode as described below, is packed in this positive electrode container, and a separator composed of a microporous polypropylene film is placed thereon. The gasket is composed mainly of polypropylene, which is interposed between the negative electrode can and the positive electrode container to keep electric insulation between the positive electrode and negative electrode, and by bending inwardly the opening edge of the positive electrode container and caulking it, the contents in the cell are sealed.

In the present example, a solution obtained by dissolving lithium perchlorate at a concentration of 1 mole/l in a 45/5/50 mixed solvent of butylene carbonate, ethylene carbonate and 1,2-dimethoxyethane. The size of the cell was such that the outer side was 9.5 mm and the total thickness was 3.0 mm.

Three positive electrodes were prepared according to the following procedures. Commercially available bismuth trioxide powder having a purity of 99% was molten and heat-treated at 900° C. for 5 hours in an electric furnace, and the melt of $Bi_2O_3$ was cast in a vessel of stainless steel (SUS304) placed on a heat-discharging iron plate maintained at the normal temperature (about 20° C.) to rapidly cool the melt and solidify it into a flat sheet having a thickness of about 1 mm. The time required for completely solidifying the melt of $Bi_2O_3$ was about several seconds at longest. The solid cooled almost to the normal temperature was pulverized to a particle size smaller than 100 μm. A positive electrode active material (a) composed of $Bi_2O_3$ powder subjected to the above mentioned melting and rapid cooling treatments was obtained. The commercially available bismuth trioxide powder was similarly molten and heat-treated at 900° C. for 5 hours in an electric furnace, and the switch of the electric furnace was turned off and the melt was naturally cooled almost day and night in the electric furnace. The cooled solid was pulverized to a size smaller than 100 μm and obtained a positive electrode active material (b). The so-obtained positive electrode active materials (a), (b) composed of $Bi_2O_3$ powder and a positive electrode active material (c) composed of untreated commercially available $Bi_2O_3$ powder as a comparison were respectively mixed with a carbonaceous conductive agent (graphite or carbon black) and a binder composed of polytetrafluoroethylene at a weight ratio of 94.5/5/0.5, and the respective mixtures were compression-molded into a pellet together with a positive electrode-holding ring having an L-shaped section and the pellet was heated and dried at 100° C. under sufficiently reduced pressure to obtain a positive electrode. Each positive electrode had a diameter of 9.0 mm and the weight of the electrode mixture was 0.28 g.

By using the so-obtained three positive electrodes, three cells which were the same except for the positive electrode were prepared.

Figure 4:
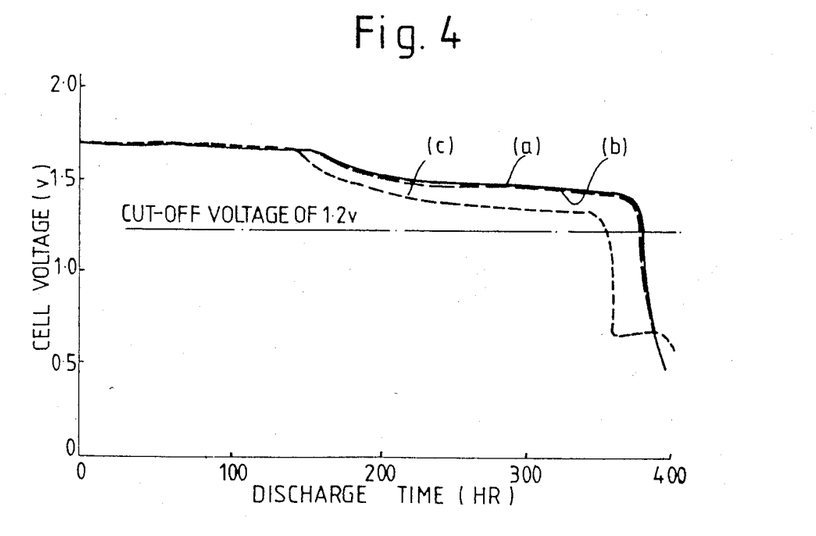
FIG. 4 is a diagram showing the discharge characteristics of the different cells under a constant resistance of 7.5 KΩ.
Figure 5:
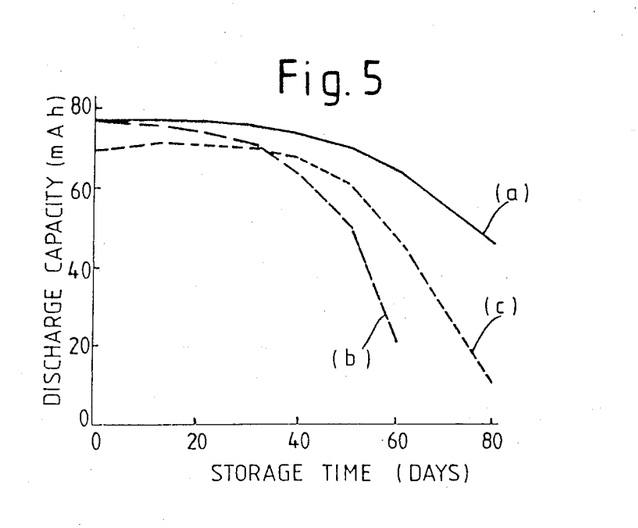
FIG. 5 is a diagram showing the change of the discharge characteristics under storage at 80° C.

Discharge characteristics of these three cells under a constant resistance of 7.5 kΩ at 20° C. are shown in FIG. 4. The relation between the discharge capacity and the storage period, observed when these cells were stored for a predetermined period at 80° C. and the discharge was similarly carried out under a constant resistance of 7.5 kΩ at 20° C., is shown in FIG. 5. The voltage for cutting off the discharge was 1.0 V. The lowest voltage obtained when the cells were stored in an atmosphere maintained at 80° C. for a predetermined period shown in FIG. 5 and pulsating discharge of 7.8 mS was carried out at −10° C. and 2 kΩ is shown in FIG. 6.

As seen from FIG. 4, when the cells (a) and (b) having $Bi_2O_3$ subjected to the melting heat treatment as the positive electrode active material are compared with the cell (c) having untreated $Bi_2O_3$ as the positive electrode active material, in the former cells, the discharge voltage in the latter-half flat voltage portion of a more than about 40% discharge depth is higher and the time of the discharge to the cut-off voltage of 1.2 V is longer, and the former cells are highly improved in the discharge characteristics and effective discharge capacity. It is also found that there is no substantial difference in the discharge characteristics between the cell (a) having $Bi_2O_3$ subjected to the rapid cooling treatment after the melting heat treatment and the cell (b) having $Bi_2O_3$ gradually cooled after the melting heat treatment.

Figure 6:
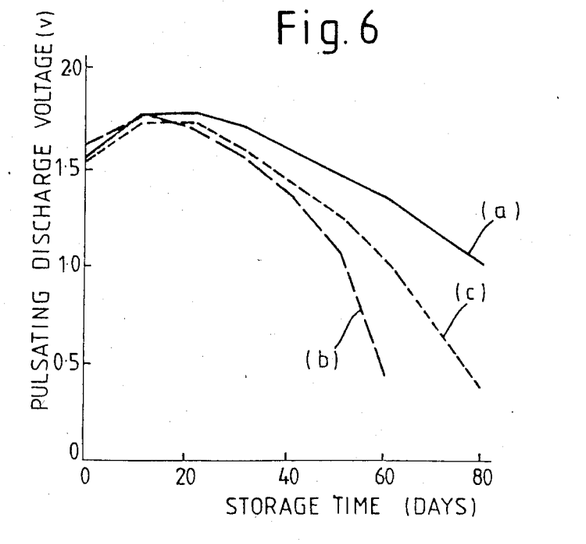
FIG. 6 is a diagram showing the change of the pulsating discharge characteristics under storage at 80° C.

From FIGS. 5 and 6, it is seen that the cell (a) having $Bi_2O_3$ subjected to the melting heat treatment and rapid cooling treatment is highly improved over the conventional cell (c) having untreated $Bi_2O_3$ in the discharge capacity and pulsating discharge voltage after long-period storage at a high temperature (80° C.), but the cell (b) having $Bi_2O_3$ gradually cooled after the melting heating treatment is not improved but rather degraded in these characteristics. Namely, it is seen that the storage characteristic is greatly influenced by the cooling method after the heat treatment, and the rapid cooling is very effective.

EXAMPLE 5

In the present example, a product obtained by melting and heat-treating bismuth trioxide at 1100° C. in an argon atmosphere, rapidly cooling the melt in the argon atmosphere, pulverizing the solid to a size smaller than 100 μm and classifying the particles was used as the positive electrode active material. A solution obtained by dissolving lithium perchlorate at a concentration of 1 mole/l in a 1/1 mixed solvent of propylene carbonate and 1,2-dimethoxyethane was used as the organic electrolyte. A cell was prepared in the same manner as in Example 4 except for these changes. The cell was subjected to the storage test under a constant resistance of 7.5 kΩ and at a temperature of 80° C. in the same manner as described in Example 4. It was found that the storage characteristic was substantially on the same level as that of the cell (a) obtained in Example 4.

EXAMPLE 6

A cell was prepared in the same manner as described in Example 4 except that bismuth trioxide was molten and heated at 850° C. under a reduced pressure of $10^{-2}$ to $10^{-3}$ Torr and then the melt was rapidly cooled. When the so-obtained cell was subjected to the storage test under a constant resistance of 7.5 kΩ and at a temperature of 80° C. in the same manner as described in Example 4, it was found that the storage characteristic of the cell was substantially on the same level as that of the cell (a) obtained in Example 4.

In the foregoing example, the melting heat treatment temperatures at only 850° C., 900° C. and 1100° C. were shown as the melting heat treatment temperature, but the gist of the present invention resides in that the melting heat treatment of $Bi_2O_3$ is carried out at a temperature higher than the melting point of $Bi_2O_3$ and the melt is rapidly cooled and solidified (coagulated) and it is sufficient if the treatment is carried out within a temperature range (or an atmosphere) where the composition of $Bi_2O_3$ is not substantially changed by reduction, thermal decomposition or the like. In general, $Bi_2O_3$ is very stable against heating at a high temperature and in a non-reducing atmosphere, no substantial change of the composition is caused at temperautres of up to about 1700° C.

Since there is no prominent difference between a heat treatment temperature higher than 1000° C. and a heat treatment temperature of up to 1000° C. in connection with the improvement of the discharge characteristic or the storage characteristic, in the production on an industrial scale, in view of equipment such as an electric furnace, the running cost and the operation adaptability, it is preferred that the melting heat treatment of $Bi_2O_3$ be carried out at a temperature in the range of from the melting point (about 820° C.) to 1000° C.

Moreover, the organic electrolyte is not limited to those disclosed in the examples. For example, solutions formed by dissolving a salt capable of being dissociated into $Li^+$ ion, such as $LiBF_4$, $LiPF_6$ or $LiCF_3SO_3$, in an aprotic organic solvent such as γ-butyrolactone, tetrahydrofuran, dioxolane or a mixed solvent thereof can be used as the organic electrolyte.

Preferably the organic electrolyte is used a mixed solvent composed mainly of butylene carbonate (hereinafter referred to as "BC") having the following formula:

and 1,2-dimethoxyethane (DME), which may further comprise ethylene carbonate (hereinafter referred to as "EC").

A salt soluble in this mixed solvent and capable of dissociating an $Li^+$ ion, which does not react directly with negative electrode Li or the positive electrode active material, is used as the supporting electrolyte. Salts having a high solubility within a broad temperature range, such as $LiClO_4$, $LiBF_4$, $LiPF_6$ and $LiCF_3SO_3$, are preferably used.

Since the ion conductivity reaches the highest when the BC/DME mixing ratio is about 1/1, it is especially preferred that the BC/DME mixing ratio be in the range of from 3/1 to 1/3.

As is observed with reference to PC when the mixed solvent of PC and DME is used as the solvent of the organic electrolyte, some decomposition of BC is observed at the terminal stage of the discharge of the cell when the mixed solvent of BC and DME is used as the solvent of the organic electrolyte. The resulting decomposition product reacts with Li to form a brown reaction product on the surface of Li and therefore the internal resistance of the cell is increased and the operating voltage is reduced. Accordingly, in the case where the duration of the discharge of the cell is stopped at a certain cut-off voltage, the effective discharge capacity is slightly reduced and the utilization of the active material is correspondingly reduced. This reduction depends on the purity of BC, the discharge current and the like, and in general this reduction is not preferred though the reduction is not substantially significant in some mode of the usage of the cell. It was found that when a mixed solvent of BC and DME, to which ethylene carbonate is added, is used, the formation of the brown reaction product on the surface of Li at the terminal stage of the discharge is controlled and is hardly observed, and the utilization ratio of the active material is improved and the discharge capacity is increased. Although the reason why the formation of the reaction product on the surface of Li is controlled by addition of EC has not been completely elucidated, it is presumed that decomposition of BC is probably controlled by addition of EC. As is seen from the results illustrated in the example given hereinafter, a sufficient effect is attained by adding EC in an amount of several percent. If the volume ratio of EC exceeds 50%, the solidification point is elevated and the operating temperature range of the cell is narrowed. Accordingly, it is preferred that the amount of EC be smaller than 50%.

When the above-mentioned mixed solvent composed mainly of BC and DME is used as the solvent of the organic electrolyte, expansion of the cell per a given discharge capacity is much smaller than in the cell containing the mixed solvent of PC and DME. Accordingly, in the cell containing the mixed solvent composed mainly of BC and DME, larger quantities of the positive electrode and negative electrode materials can be packed in a certain cell space, and the discharge capacity per unit volume can be highly improved.

The reason why expansion of the cell by the discharge is reduced in the cell of the present invention has not been completely elucidated. However, it is presumed that the reason is probably as follows.

The cell discharge reaction between bismuth trioxide and lithium is represented by the following formula (1) and the reaction products are Bi and $Li_2O$:

$$6Li + Bi_2O_3 \rightarrow 2Bi + 3Li_2O \ldots \quad (1)$$

In this reaction, as shown in Table 1, as calculated from the densities and formula weights of Li, $Bi_2O_3$, Bi and $Li_2O$, the value of the total volume of Bi and $Li_2O$ per mole of $Bi_2O_3$ after the cell reaction, calculated from the reaction quantities of the formula (1), is smaller than the total volume of Li and $Bi_2O_3$ before the reaction. However, in the actual discharge of the cell, the cell is expanded. The reason is presumed to be that the reaction product is not formed on the positive electrode so simply as represented by the formula (1) but the reaction is advanced while the electrolyte is included in the reaction product. In fact, when the cell is disassembled after the reaction, it is seen that the electrolyte is substantially absorbed and included in the positive electrode reaction product, and any liquid is hardly observed. Since the solvent of the electrolyte is absorbed and included in the positive electrode reaction product and the positive electrode is hence expanded, it is presumed that the kind and state of the solvent of the electrolyte have serious influences on expansion of the positive electrode by the discharge.

TABLE 1

| | Volume ($cm^3$) before Reaction | | Volume ($cm^3$) after Reaction |
|---|---|---|---|
| 6Li | 78.0 | 2Bi | 42.6 |
| $Bi_2O_3$ | 52.4 | $3Li_2O$ | 44.6 |
| Total | 130.4 | Total | 87.2 |

EXAMPLE 7

A cell was prepared in the same manner as described in Example 4 except for the electrolyte.

As the electrolyte, the following three solutions were used in the present example.

(a) A solution formed by dissolving 1 mol/l of LiClO$_4$ in a 1/1 volume ratio mixed solvent of BC and DME.

(b) A solution formed by dissolving 1 mol/l of LiClO$_4$ in a 45/50/5 volume ratio mixed solvent of BC/DME/EC.

(c) An electrolyte formed by dissolving 1 mol/l of LiClO$_4$ in a 1/1 volume ratio mixed solvent of PC and DME.

The three cells which were the same except for the type of the electrolyte were fabricated by using the foregoing electrolytes, respectively. Each cell had a size of the diameter 9.45 mm and the height 3.0 mm. The amount of each electrolyte charged was 45 μl per cell.

Figure 7:
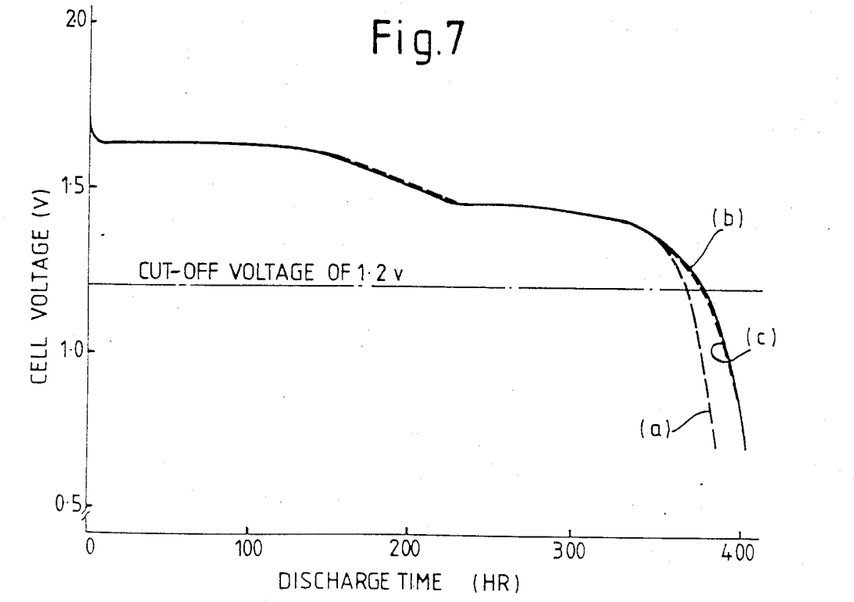
FIG. 7 is a diagram showing the discharge characteristics of the cells under a constant resistance of 7.5 KΩ.

With respect to each cell, the discharge characteristics under a constant resistance of 7.5 kΩ were measured at 20° C. The obtained results are shown in FIG. 7. The discharge capacity was measured to a cut-off voltage of 1.2 v, and the discharge was carried out under a constant resistance of 7.5 kΩ for 550 hours (at this point, the discharge was completed in all of the cells and the operating voltage was 0 V) and the difference in the height between the cell before the discharge and the cell after the discharge was measured. The obtained results are shown in Table 2.

TABLE 2

| Electrolyte | Capacity (mAh) | Expansion (mm) by Discharge | Height (mm) after Discharge |
|---|---|---|---|
| (a) | 74.0 | 0.16 | 3.16 |
| (b) | 76.1 | 0.17 | 3.17 |
| (c) | 75.8 | 0.36 | 3.36 |

Note
Each value is a mean value of 20 samples.

As is apparent from the foregoing results, there is no substantial difference between the cell (b) of the present arrangement and the cell (c) in the discharge capacity attained to the cut-off voltage of 1.2 V, but in the cell (b) of the present arrangement, expansion of the cell by the discharge is much smaller than in the cell (c). More specifically, if the maximum height of the cell allowable by the instrument to which the cell is attached is 3.2 mm, a discharge capacity of at least 76 mAh can be taken out of the cell (b) of the present arrangement. In contrast, in the case of the cell (c), if the discharge capacity exceeds 76 mAh, the cell height increases beyond 3.36 mm, and therefore, in order to control the cell height to up to 3.2 mm, it is necessary to reduce the quantitities of the positive electrode and negative electrode materials by about 10%, and the discharge capacity that can be taken out is correspondingly reduced.

In the case of the cell (a), as shown in FIG. 7, the internal resistance is increasd at the terminal stage of the discharge and the operating voltage is somewhat reduced and therefore the discharge capacity attained to the cut-off voltage of 1.2 V is slightly smaller than those of the cells (b) and (c). However, the expansion of the cell (a) by the discharge is much smaller than the expansion of the cell (c), as in the cell (b). Accordingly, the capacity per unit allowable volume is much larger in the cell (a) of the present arrangement than in the cell (c). Furthermore, the fact that the change of the shape of the cell is very small is very advantageous for the reliability and safety of the instrument to which the cell is attached.

Preferably the electrically conductive material for the positive electrode comprises conductive furnace carbon obtained according to the furnace type incomplete combustion method where a natural gas or a gaseous higher hydrocarbon is incompletely burnt in a combustion furance or in combination with graphite.

As a preferred example of the conductive furnace carbon black, a product marketed under the tradename of "Ketjen Black EC" by Akzo is employed.

The closed circuit voltage of a cell fabricated by using conductive furnace carbon black as the conductive agent is highly improved over the closed circuit voltage of a cell fabricated by using the same amount of graphite or acetylene black. It is construed that the reason why the closed circuit voltage is improved is that conductive furnace carbon black is excellent over customarily used acetylene black or graphite in the conductivity characteristics when incorporated in the positive electrode and also in the wettability with an electrolyte and the liquid-absorbing property.

In the case where a positive electrode mixture containing conductive furnace carbon black is compression-molded into an electrode body having a certain shape, since the moldability of the electrode mixture is much poorer than the moldability of the electrode mixture containing graphite or the like, in order to obtain a mechanical strength necessary for fabrication of a cell, it is preferred that the amount of added conductive furnace carbon black be smaller than 2% by weight. It was found that even if the amount of added conductive furnace carbon black is smaller than 2% by weight, a sufficient conductivity can be obtained.

In the case where graphite is used in combination with less than 2% by weight of conductive furnace carbon black, the mechanical strength of the positive electrode molded body is higher than the mechanical strength attained when conductive furnace carbon black alone is used and, if necessary, a larger amount of the conductive agent can be added and a higher positive electrode conductivity can be realized. Moreover, as compared with the case where graphite alone is used, the conductivity of the positive electrode is highly improved with a smaller amount of the conductive agent. Accordingly, when conductive furnace carbon black is used, the closed circuit voltage of the cell can be increased and simultaneously, the discharge capacity can be greatly increased by reducing the amount of the conductive agent in the positive electrode and increasing the amount of the positive electrode active material.

The present arrangement will now be described in detail with reference to the following example.

EXAMPLE 8

$Bi_2O_3$ powder as the positive electrode active material, Ketjen Black EC powder, acetylene black powder or graphite powder as the conductive agent and a fluororesin as the binder were mixed together at weight ratios shown in Table 3, and a predetermined amount of the mixture was packed in a mold and the mixture was compression-molded into a pellet together with a positive electrode-holding ring of stainless steel having an L-shaped section. The molded body was heated and dried under reduced pressure at 100° C. for 10 hours to form a positive electrode.

The cell was prepared in the same manner as described in Example 1 except for the electrically conductive material.

The cell was subjected to the discharge operation under a constant resistance of 7.5 kΩ. The discharge capacity and the closed circuit voltage at −10° C. were measured. The obtained results are shown in Table 4. The final voltage of the discharge capacity was 1.0 V, and the closed circuit voltage was measured according to the 7.8 msec pulse method under a load resistance of 2 kΩ.

TABLE 3

| Cell | $Bi_2O_3$ | Graphite | Acetylene Black | Ketjen Black | Fluoro-Resin |
|---|---|---|---|---|---|
| A | 93 | 6 | 0 | 0 | 1.0 |
| B | 95 | 4 | 0 | 0 | 1.0 |
| C | 97 | 2 | 0 | 0 | 1.0 |
| D | 97 | 0 | 2 | 0 | 1.0 |
| E | 98 | 0 | 1 | 0 | 1.0 |
| F | 97 | 0 | 0 | 2 | 1.0 |
| G | 98 | 0 | 0 | 1 | 1.0 |
| H | 98.5 | 0 | 0 | 0.5 | 1.0 |
| I | 97 | 1.5 | 0 | 0.5 | 1.0 |

TABLE 4

| Cell | Capacity (mAh) | Closed Circuit Voltage (V) |
|---|---|---|
| A | 71.3 | 1.51 |
| B | 74.4 | 1.45 |
| C | 78.0 | 1.35 |
| D | 78.0 | 1.38 |
| E | 79.2 | 1.26 |
| F | 78.1 | 1.62 |
| G | 79.4 | 1.55 |
| H | 80.5 | 1.38 |
| I | 79.3 | 1.58 |

As is apparent from the foregoing results, both of the capacity and the closed circuit voltage are greatly influenced by the amount of the conductive agent (acetylene black, Ketjen Black or graphite). In the case of cells F, G and H fabricated by using conductive furnace carbon black (Ketjen Black), a higher closed circuit voltage and a higher discharge capacity can be obtained with a smaller amount of the added conductive agent than in the case of cells A, B and C fabricated by using graphite and cells D and E fabricated by using acetylene black. Furthermore, in the case of the cell I fabricated by using conductive furnace carbon and graphite in combination, the discharge capacity is much higher than in the case of cells C, D and F containing the same amount of the conductive agent as in the cell I, and the closed circuit voltage of the cell I is slightly lower than that of the cell F containing conductive furnace carbon alone as the conductive agent but there is no substantial difference from the practical viewpoint. The closed circuit voltage of the cell I is apparently higher than those of the cell C containing graphite alone and the cell D comprising acetylene black alone. In case of the cell F fabricated by using 2% by weight of conductive furnace carbon black alone as the conductive agent, chipping or breaking is caused at a level of about 10% in the compression molding or transfer of the positive electrode pellet. In contrast, this defective level is substantially 0% in the case of the cell I fabricated by using both of conductive furnace carbon black and graphite in a total amount of 2% by weight.

Of cource, the invention is not limited to the examples which are described hereinabove; in particular, the electric cell which uses the active material in accordance with the invention can have any other suitable configuration.

Additionally, the cell may not have the impregnating member. In this case, the electrolyte is contained in the positive electrode and/or the negative electrode. The preferred embodiments described herein are therefore illustrative and not restrictive, the scope of the invention being indicated by the appended claims and all variations which come within the meaning of the claims are intended to be embraced therein.

What is claimed is:

1. An organic electrolyte cell comprising:
   a negative electrode;
   a positive electrode including a main active material composed of bismuth trioxide $Bi_2O_3$ heat-treated at a temperature above 800° C.; and
   an organic electrolyte comprising an organic solvent and a salt dissolved in the organic solvent.

2. An organic electrolyte cell as claimed in claim 1; wherein the bismuth trioxide $Bi_2O_3$ is heat-treated at a temperature in the range of 700° C. to 1000° C. in the air, in an inert gas or in a vacuum.

3. An organic electrolyte cell as claimed in claim 1; wherein the bismuth trioxide $Bi_2O_3$ is heat-treated at a temperature in the range of 800° C. to 1000° C. in the air, in an inert gas or in a vacuum.

4. An organic electrolyte cell as claimed in claim 1; wherein the organic solvent comprises a mixed solvent composed mainly of butylene carbonate and 1,2-dimethoxyethane.

5. An organic electrolyte cell as claimed in claim 4; wherein the organic solvent further comprises ethylene carbonate.

6. An organic electrolyte cell as claimed in claim 4; wherein the salt comprises lithium perchlorate $LiClO_4$.

7. An organic electrolyte cell as claimed in claim 1; wherein the positive electrode includes an electrically conductive material.

8. An organic electrolyte cell as claimed in claim 7; wherein the electrically conductive material comprises conductive furnace carbon black produced by the furnace type incomplete combustion method.

9. An organic electrolyte cell as claimed in claim 7; wherein the electrically conductive material comprises graphite and conductive furnace carbon black.

10. An organic electrolyte cell as claimed in claim 8; wherein the positive electrode contains the conductive furnace carbon black smaller than 2% by weight based on the positive electrode.

11. An organic electrolyte cell as claimed in claim 1; wherein the negative electrode comprises lithium.

12. An organic electrolyte cell comprising:
a negative electrode composed of lithium as a negative active material;
a positive electrode comprising bismuth trioxide $Bi_2O_3$ heat-treated at a temperature above 650° C. as a positive active material, an electrically conductive material and a binder; and
an organic electrolyte comprising a mixed solvent containing lithium perchlorate, said mixd solvent being composed of butylene carbonate, 1,2-dimethoxyethane and ethylene carbonate.

13. An organic electrolyte cell comprising:
a negative electrode composed of lithium as a negative active material;
a positive electrode comprising bismuth trioxide $Bi_2O_3$ heat-treated at a temperature above 800° C. as a positive active material, an electrically conductive material and a binder; and
an organic electrolyte comprising a mxied solvent containing lithium perchlorate, said mixed solvent being composed of butylene carbonate, 1,2-dimethoxyethane and ethylene carbonate.

14. An organic electrolyte cell as claimed in claim 12; wherein the bismuth trioxide $Bi_2O_3$ is heat-treated at a temperature higher than the melting point of $Bi_2O_3$ and subjected to a quenching treatment.

15. An electro-chemical cell comprising: an organic electrolyte containing an organic solvent and a salt dissolved in the organic solvent; a negative electrode composed of a negative active material; and a positive electrode containing a positive active material and being electro-chemically coupled to the negative electrode through the organic electrolyte, the positive active material being composed of bismuth trioxide $Bi_2O_3$ heat-treated at a temperature above 650° C. so as to increase the discharge capacity of the cell as compared to a cell in which the positive active material composed of bismuth trioxide $Bi_2O_3$ is heat-treated at a temperature below 650° C.

16. An electro-chemical cell comprising: an organic electrolyte containing an organic solvent and a salt dissolved in the organic solvent; a negative electrode composed of a negative active material; and a positive electrode containing a positive active material and being electro-chemically coupled to the negative electrode through the organic electrolyte, the positive active material being composed of bismuth trioxide $Bi_2O_3$ heat-treated at a temperature above 800° C. so as to increase the discharge capacity of the cell as compared to a cell in which the positive active material composed of bismuth trioxide $Bi_2O_3$ is heat-treated at a temperature below 800° C.

17. An electro-chemical cell as claimed in claim 15; wherein the positive electrode contains a positive active material composed of bismuth trioxide $Bi_2O_3$ heat-treated at a temperature in the range of 700° C. and 1000° C.

18. An electro-chemical cell as claimed in claim 16; wherein the positive electrode contains a positive active material composed of bismuth trioxide $Bi_2O_3$ heat-treated at a temperature in the range of 800° C. and 1000° C.

19. An electro-chemical cell as claimed in claim 18; wherein the organic solvent contains ethylene carbonate.

20. An electro-chemical cell as claimed in claim 15; wherein the salt is comprised of lithium perchlorate $LiClO_4$.

21. An electro-chemical cell as claimed in claim 15, wherein the positive electrode contains an electrically conductive material.

22. An electro-chemical cell as claimed in claim 21; wherein the electrically conductive material is comprised of furnace carbon produced by incomplete combustion of gaseous hydrocarbon.

23. An electro-chemical cell as claimed in claim 22; wherein the positive electrode contains less than 2% by weight of the electrically conductive material.

24. An electro-chemical cell as claimed in claim 21; wherein the electrically conductive material is comprised of graphite and furnace carbon produced by incomplete combustion of gaseous hydrocarbon.

25. An electro-chemical cell as claimed in claim 15; wherein the negative active material is comprised of lithium.

* * * * *